Aug. 12, 1930.   H. E. ALLEN   1,772,448
APPARATUS FOR PRODUCING SHEET GLASS
Original Filed Jan. 10, 1921   2 Sheets-Sheet 1

INVENTOR.
Horace E. Allen.
Frank Fraser
ATTORNEY.

Aug. 12, 1930.  H. E. ALLEN  1,772,448
APPARATUS FOR PRODUCING SHEET GLASS
Original Filed Jan. 10, 1921   2 Sheets-Sheet 2
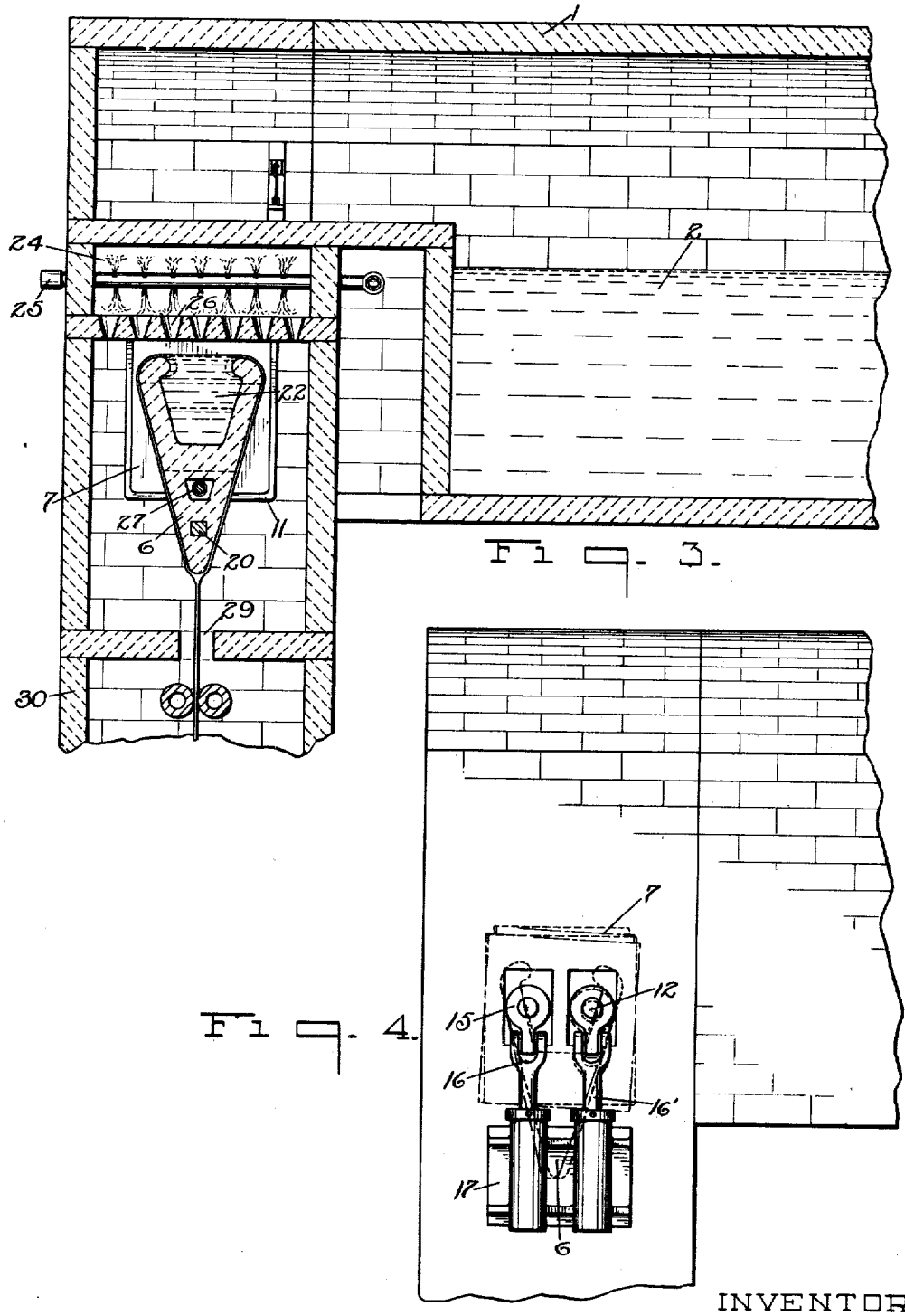
INVENTOR.
Horace E. Allen.
Frank Frasu
ATTORNEY.

Patented Aug. 12, 1930

1,772,448

UNITED STATES PATENT OFFICE

HORACE E. ALLEN, OF TOLEDO, OHIO, ASSIGNOR TO LIBBEY-OWENS-FORD GLASS COMPANY, OF TOLEDO, OHIO, A CORPORATION OF OHIO

APPARATUS FOR PRODUCING SHEET GLASS

Original application filed January 10, 1921, Serial No. 436,039. Divided and this application filed October 10, 1924. Serial No. 742,796.

This invention relates to the art of making sheet glass, and more particularly to an improved process and apparatus for drawing glass downwardly into sheet form. According to this invention molten glass in an extremely fluid condition is caused to flow freely and continuously from a container in such a way that the surfaces of the flowing streams, which eventually form the outer surfaces of the glass sheet, never from the time they leave the molten bath until the sheet has formed and set, contact with anything except the surrounding heated atmosphere. In this way a sheet devoid of surface mars or scratches of any kind, and having a fine fire-polished surface is produced. Furthermore, the container employed is mounted in a manner that it can be raised or lowered at either end as desired, while at the same time it is mounted in a manner to permit tiltable adjustment so that the streams flowing from the container can be regulated as desired.

An important object of the invention is to provide apparatus of this character, employing a container in the form of a slab having a glass receiving trough therein that is adapted to be tiltably adjusted to facilitate accurate control of the overflow of molten glass from within the trough of the said slab.

Another important object of the invention is to provide an apparatus employing a slab having a trough therein wherein a supply of molten glass is introduced within the trough and permitted to overflow or spill over the trough in a manner to flow down the opposite sides of the slab, at the end of which they merge together to form a single sheet, the said slab being mounted for vertical adjustment and for tiltable adjustment, whereby the overflow from the trough can be regulated to produce the desired overflow on both sides of the slab in a manner to give a smooth flat sheet.

Other objects and advantages of the invention will become apparent during the course of the following description.

Figure 1:
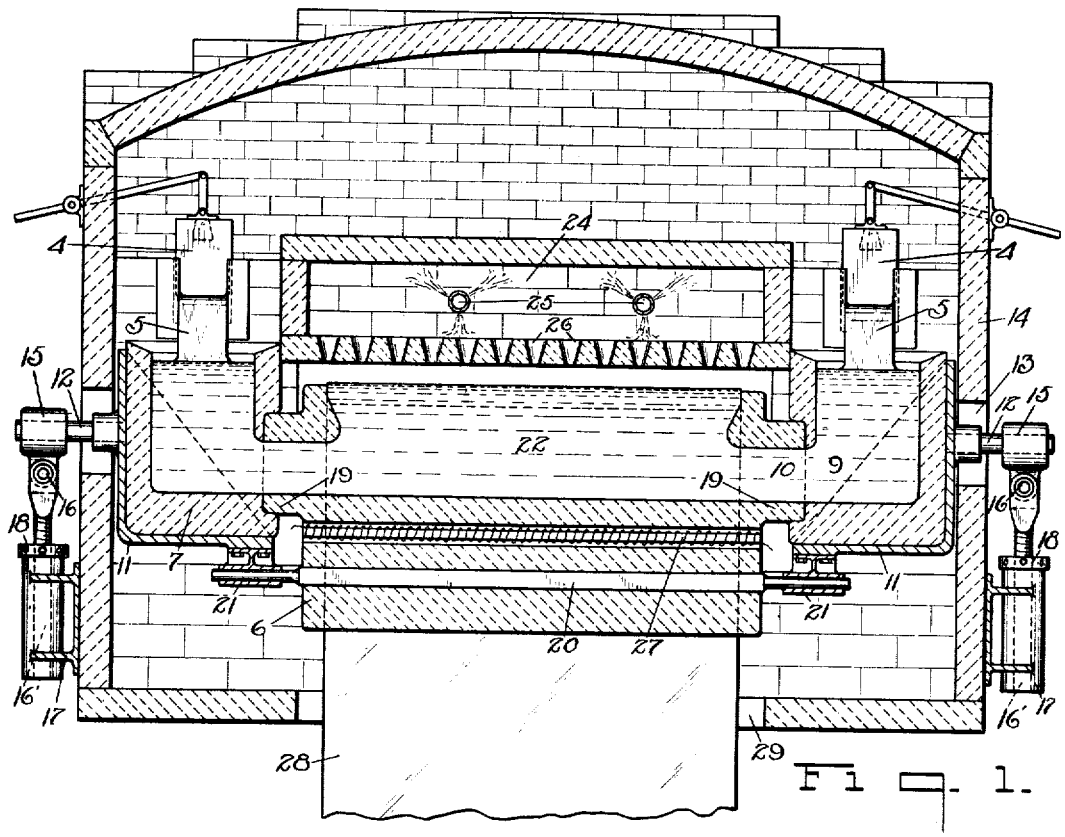
Figure 2:
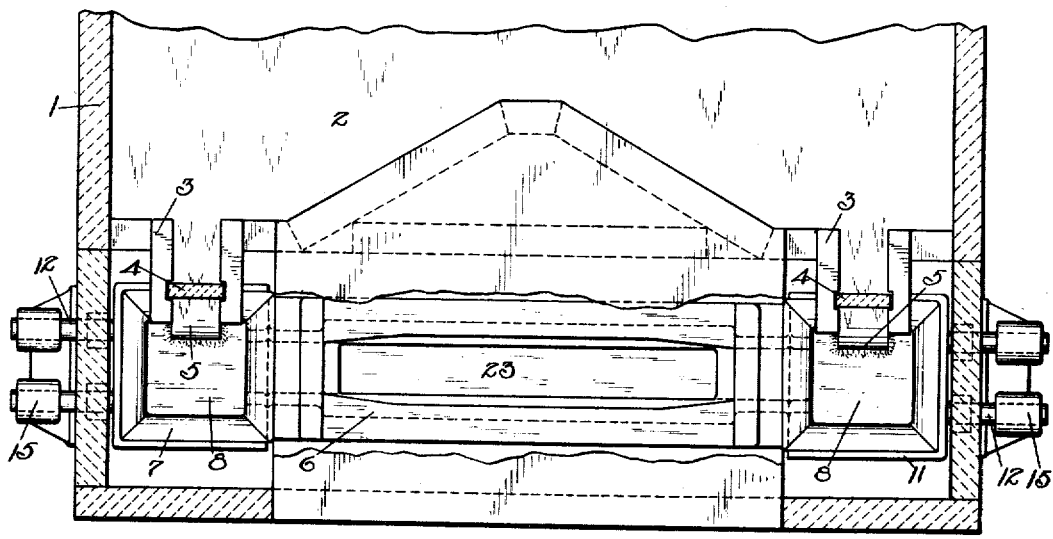

In the drawings wherein like numerals are employed to designate like parts throughout the same, Fig. 1 is a vertical transverse section through the apparatus, Fig. 2 is a horizontal section through the apparatus taken substantially on line 2—2 of Fig. 1, part of the heating chamber above the overflow receptacle being broken away to disclose the upper portion of the receptacle, Fig. 3 is a central longitudinal vertical section through the apparatus taken substantially on the line 3—3 of Fig. 1, and Fig. 4 is a fragmentary end view of the adjusting mechanism showing various positions of the overflow slab or receptacle.

The subject-matter of this invention is disclosed in my copending application for sheet glass drawing apparatus, filed January 10, 1921, and bearing Serial No. 436,039, the present application being a division of same.

At 1 is indicated conventionally the discharge end of a continuous tank furnace which serves as a continuous source of molten glass for the sheet forming apparatus. A bath of molten glass 2 is disposed in the tank 1. A pair of conduits 3 lead from the discharge end of the tank, each conduit being provided with a gate or closure shown in the form of a shear-cake 4, whereby the flow of glass 5 through the conduit may be cut off or suitably regulated.

The sheet forming mechanism is here shown as comprising three main parts, a central wedge-shaped container or slab 6, and two end supply receptacles or pots 7, each constructed of some suitable refractory material such as fire-clay. Each receptacle 7 has an upper open end 8 for receiving the flow of glass from the conduit 3, and a lower passage 9 communicating with a similar passage 10 in the adjacent end of the wedge-shaped container or slab 6. The receptacles 6 and 7 are substantially permanently united, and could if desirable or practical be formed as a single unit. Each receptacle 7 is supported in a metallic bracket 11 which has a pair of supporting stub shafts or rods 12 projecting out through an aperture 13 in the adjacent side of an enclosing chamber 14. The stub shafts 12 are each supported in a journal member or collar 15. The collars or journals 15 are pivotally connected to a screw-shaft 16' by means of a suitable pin or the like 16. Each screw 16' is slidable vertically in an internally threaded aperture formed in the supporting bracket 17, and is held in the desired adjustment by means of the lock nut 18 carried by the upper face of the supporting bracket 17.

As is shown clearly in Figs. 1 and 2, a pair of stub shafts 14 are disposed at both ends of the machine and are adapted for vertical adjustment either simultaneously, or if it is desired, one side or the other can be raised or lowered, thus placing either pair of the alined stub shafts in a longitudinal plane above or below the longitudinal plane of the remaining pair.

The wedge-shaped slab or container 6 is supported between the two receptacles 7 partially by the end extensions 19 which project into similar recesses in the adjacent sides of the receptacle 7, and partially by the metallic supporting member 20, which is embedded in the lower portion of the slab, as shown in Fig. 1. The ends of the member 20 are carried by supporting brackets 21 depending from the brackets 11. The member 6, as best shown in Fig. 3, is of a narrow wedge-shape and is hollow at the thick upper end to form a trough or receptacle 22 for the molten glass which is fed in through the end passages 10. The upper side of the member 6 is open in the form of a long narrow slot 23, so that the molten glass will overflow through this slot and spill over the sides of the container 6. The shallow sheet-like streams of glass which overflow at the sides of the container will adhere to the inwardly sloping sides of the container and come together at the lower edge of the wedge or slab to form a single stream of glass. By manipulating the screw-threaded shafts 16' in the brackets 17, the slab 6 can be raised or lowered at either end as desirable, while at the same time the slab can be tilted as indicated in dotted lines in Fig. 4, so that the shallow stream-like flow of glass can be regulated. Obviously, by tilting the slab, as indicated in Fig. 4, to one side or the other by raising and lowering the screw-threaded shafts 16', the flow of glass over either side of the slab 6 can be thinned out or thickened as desired to produce the required form of sheet. It will thus be seen that the slab 6 is tiltably mounted by means of the four stub shafts so that the slab can be tiltably adjusted at any time during the sheet forming operation without in any way disturbing the continuous operation of the machine, while at the same time an accurate control of the overflow can be had.

The enclosing chamber 14 which substantially surrounds the glass containing receptacles 6 and 7 is here connected at its upper end with the furnace chamber and also contains suitable burners, which are not shown, to maintain the entire surrounding atmosphere at a high heat as the molten glass must be kept in a highly fluid condition to insure the proper operation of the apparatus. Directly above the container 6 is a heating chamber 24 having burners 25 therein and a series of apertures 26 in its bottom to direct the heat downwardly onto the flowing glass. Also to maintain the lower portion of the slab 6 at the proper temperature an electric heating apparatus may be placed in the body of the wedge below the receptacle 22 as indicated conventionally at 27.

In operation the gates 4 are adjusted to attain a suitable flow of molten glass from the tank 1. This glass flows into a receptacle 7 through passages 9 and 10 to the receptacle 22 and overthrows through opening or slot 23, and down around the converging sides of the wedge member. The temperature is so regulated that the streams of molten glass will flow freely down the exterior of the container 6, but still be sufficiently viscous to maintain a sheet-like formation and adhere somewhat to the outer walls of the container. At the lower edge of the wedge or slab where the converging walls come together the two streams unite and it will be observed that the two inner faces of the streams which have been in engagement with the walls of the container merge into the interior of the sheet, the two outer surfaces of the sheet being formed from the outer surfaces of the streams which have never from the inception of the flowing process contacted with any portion of the container or other structure. In this way a sheet having a fine fire polish on both faces and free from mars or scratches is obtained.

In order to maintain the desired flow of glass down the sides of the converging faces of the slab 6, the shafts 16' may be raised and lowered within the supporting brackets 17, thus tilting the slab in either direction as is indicated in Fig. 4. This tilting of the slab will obviously make it possible to accurately control the overflow of the molten glass so that both streams will be of the same thickness at all times. Furthermore, one end or the other of the slab can be raised or lowered so that an even stream throughout the entire length of the slab can be had. After the sheet has left the slab 6, it may be allowed to flow away under its own weight through a slot 29 in the lower face of chamber 14, either into the open air or into a suitable annealing chamber 30, as shown in Fig. 3. Any suitable apparatus may be employed for annealing the sheet and for dividing the sheet into sections of the desired size after it has been annealed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a glass drawing apparatus, a slab, means to deliver glass to the upper end of the slab, means whereby the glass is permitted to flow from said upper end over the surface of the slab, and means to mount the slab for lateral tiltable adjustment to regulate the supply of glass delivered to the slab surface.

2. In a glass drawing apparatus, a slab, means for supplying molten glass to the interior of the slab, the glass overflowing to entirely surround the side of the slab and flowing off in sheet form from the edge thereof, and means to mount the slab for lateral tiltable adjustment whereby to regulate the distribution of the glass.

3. In a glass drawing apparatus, a receptacle having downwardly converging side portions, means for supplying molten glass to the interior of the receptacle, a spillway at the upper portion of the receptacle from which the glass overflows down the two sides thereof, and means to mount the receptacle for tiltable adjustment to control the flow of glass down the two sides thereof.

4. In an apparatus for producing sheet glass, a hollow member having a longitudinal opening at the top and intake openings at its ends, means for supplying molten glass through the end openings, the glass overflowing through the top of the member, flowing down around the sides thereof, and uniting at the lower side of the member to flow off as a single sheet of glass, and means to mount the hollow member for tiltable adjustment.

5. In an apparatus for producing sheet glass, a container for molten glass having a longitudinal opening at the top, means for feeding molten glass to the container so that the glass will overflow through the opening and down the outer sides of the container, means to mount the container for tiltable adjustment for controlling the overflow, the two down-flowing streams of glass uniting to form a single sheet of glass.

6. In an apparatus for producing sheet glass, a container for molten glass having a longitudinal opening at the top, means for supplying molten glass to the container so that the glass will flow through the opening and down the two sides of the container, the two streams of molten glass uniting below the container, means for mounting the container for tiltable and vertical adjustment, and means for carrying away the united streams as a single sheet of glass.

7. In an apparatus for producing sheet glass, a heated wedge-shaped slab, means for supplying molten glass to the interior of the slab, the glass overflowing to entirely surround the sides of the slab and flowing of in sheet form from the edge of the slab, and means for mounting the slab for tiltable adjustment to control the overflow of glass.

8. In an apparatus for producing sheet glass, a wedge-shaped slab having a trough therein, tanks associated with the ends of the slab to supply molten glass to the trough, bracket means for supporting the tanks and slab, stub shafts carried by the bracket means, and means to raise or lower the stub shafts to tilt the said slab and tanks.

9. In an apparatus for producing sheet glass, a wedge-shaped slab having a trough therein, tanks associated with the ends of the slab to supply molten glass to the trough, bracket means for supporting the tanks and slab, stub shafts carried by the bracket means, means to raise or lower the stub shafts to tilt the said slab and tanks, and means to hold the said shafts in the desired adjustment.

10. In a glass drawing apparatus, a slab, means to flow glass on the surface of the slab, means to mount the slab for vertical adjustment and lateral tiltable adjustment, and means to hold the said means in the desired adjustment.

11. In a glass drawing apparatus, a slab, means to flow a stream of glass down both sides of the slab, and means for independently controlling the quantity flow of glass on both sides, and means for drawing the two streams in united sheet form from the end of the slab.

12. In mechanism of the character described, the combination of a vertically disposed slab having a glass-receiving chamber in the upper end thereof wherefrom a supply of glass overflows to the sides of the slab, and means for mounting said slab for tiltable movement whereby to regulate the flow of the glass down opposite sides of the slab.

13. In a glass drawing apparatus, the combination of a vertically disposed slab down opposite sides of which glass is permitted to flow, said slab having a glass-receiving recess in its top from which the glass overflows down opposite sides of the slab, and means for mounting said slab for pivotal movement whereby the thickness of the glass at opposite sides of the slab may vary.

14. In a mechanism of the character described, a vertically disposed slab having a glass-receiving chamber in the upper end thereof wherefrom glass is permitted to overflow down opposite sides of the slab, and adjustable supports at the ends of the slab permitting the slab to be tilted and thereby relatively adjust the quantity of glass delivered to the upper portion of opposite sides of the slab.

15. In mechanism of the character described, the combination of a vertically disposed slab, adapted to receive on its top a supply of glass which overflows down opposite sides of the slab, and adjustable supporting means for the slab permitting the same to be raised or lowered while maintaining the upper portion thereof level, and said supporting means also permitting one end of the slab to be raised or lowered a greater distance than the opposite end.

16. In a mechanism of the character described, the combination of a vertically disposed slab having a receptacle in the top thereof and opposed surfaces inclining inwardly towards the lower end of the slab, the receptacle being adapted to receive a supply of glass which overflows therefrom over opposite surfaces of the slab, and means to adjust the slab to regulate the inclination thereof and thereby regulate the supply of glass to opposed surfaces.

17. In a mechanism of the character described, the combination of a vertically-disposed slab having a receptacle in the top thereof and opposed surfaces inclining inwardly towards the lower end of the slab, the receptacle being adapted to receive a supply of glass which overflows therefrom over opposite surfaces of the slab, means to adjust the slab to regulate the inclination thereof and thereby regulate the supply of glass to opposed surfaces, and means for retaining said slab in adjusted position.

18. In a mechanism of the character described, the combination of a vertically disposed slab having a glass-receiving chamber in the upper end thereof wherefrom the glass is permitted to overflow down opposed sides of the slab, supporting means at opposite ends of the slab, said supporting means constituting in effect a fulcrum permitting the slab to have tiltable adjustment, whereby to relatively regulate the supply of glass to the respective surfaces of the slab.

Signed at Toledo, in the county of Lucas, and State of Ohio, this 7th day of October, 1924.

HORACE E. ALLEN.

CERTIFICATE OF CORRECTION.

Patent No. 1,772,448.                               Granted August 12, 1930, to

HORACE E. ALLEN.

It is hereby certified that error appears in the printed specification of the above numbered patent requiring correction as follows: Page 3, strike out lines 93 to 99, comprising claim 11; same page, lines 100, 108, 117, 127, and page 4, lines 8, 19 and 31, for claim numbers 12, 13, 14, 15, 16, 17 and 18, read 11, 12, 13, 14, 15, 16 and 17; and that the said Letters Patent should be read with these corrections therein that the same may conform to the record of the case in the Patent Office.

Signed and sealed this 21st day of October, A. D. 1930.

M. J. Moore.

site sides of the slab, and adjustable supporting means for the slab permitting the same to be raised or lowered while maintaining the upper portion thereof level, and said supporting means also permitting one end of the slab to be raised or lowered a greater distance than the opposite end.

16. In a mechanism of the character described, the combination of a vertically disposed slab having a receptacle in the top thereof and opposed surfaces inclining inwardly towards the lower end of the slab, the receptacle being adapted to receive a supply of glass which overflows therefrom over opposite surfaces of the slab, and means to adjust the slab to regulate the inclination thereof and thereby regulate the supply of glass to opposed surfaces.

17. In a mechanism of the character described, the combination of a vertically-disposed slab having a receptacle in the top thereof and opposed surfaces inclining inwardly towards the lower end of the slab, the receptacle being adapted to receive a supply of glass which overflows therefrom over opposite surfaces of the slab, means to adjust the slab to regulate the inclination thereof and thereby regulate the supply of glass to opposed surfaces, and means for retaining said slab in adjusted position.

18. In a mechanism of the character described, the combination of a vertically disposed slab having a glass-receiving chamber in the upper end thereof wherefrom the glass is permitted to overflow down opposed sides of the slab, supporting means at opposite ends of the slab, said supporting means constituting in effect a fulcrum permitting the slab to have tiltable adjustment, whereby to relatively regulate the supply of glass to the respective surfaces of the slab.

Signed at Toledo, in the county of Lucas, and State of Ohio, this 7th day of October, 1924.

HORACE E. ALLEN.

CERTIFICATE OF CORRECTION.

Patent No. 1,772,448.                    Granted August 12, 1930, to

HORACE E. ALLEN.

It is hereby certified that error appears in the printed specification of the above numbered patent requiring correction as follows: Page 3, strike out lines 93 to 99, comprising claim 11; same page, lines 100, 108, 117, 127, and page 4, lines 8, 19 and 31, for claim numbers 12, 13, 14, 15, 16, 17 and 18, read 11, 12, 13, 14, 15, 16 and 17; and that the said Letters Patent should be read with these corrections therein that the same may conform to the record of the case in the Patent Office.

Signed and sealed this 21st day of October, A. D. 1930.

M. J. Moore.